(12) United States Patent
Downer et al.

(10) Patent No.: US 6,608,396 B2
(45) Date of Patent: Aug. 19, 2003

(54) ELECTRICAL MOTOR POWER MANAGEMENT SYSTEM

(75) Inventors: Scott D. Downer, Torrance, CA (US); James F. Lazar, Moorpark, CA (US); James M. Nagashima, Cerritos, CA (US)

(73) Assignee: General Motors Corporation, Detroit, MI (US)

( * ) Notice: Subject to any disclaimer, the term of this patent is extended or adjusted under 35 U.S.C. 154(b) by 34 days.

(21) Appl. No.: 10/008,921

(22) Filed: Dec. 6, 2001

(65) Prior Publication Data
US 2003/0107352 A1 Jun. 12, 2003

(51) Int. Cl.[7] .................................................. B60L 11/00
(52) U.S. Cl. ........................... 290/40 C; 290/45; 307/45
(58) Field of Search ................................ 290/40 C, 16, 290/45; 307/45; 701/22

(56) References Cited

U.S. PATENT DOCUMENTS

| | | | | | |
|---|---|---|---|---|---|
| 4,920,475 | A | * | 4/1990 | Rippel | .......................... 363/132 |
| 5,373,195 | A | * | 12/1994 | De Doncker et al. | ......... 307/45 |
| 5,710,699 | A | * | 1/1998 | King et al. | .................. 363/132 |
| 5,796,175 | A | * | 8/1998 | Itoh et al. | ................... 307/10.1 |
| 5,968,905 | A | * | 10/1999 | Patterson | ...................... 514/12 |
| 5,969,624 | A | * | 10/1999 | Sakai et al. | .................. 340/636 |
| 6,331,365 | B1 | * | 12/2001 | King | .............................. 429/9 |

* cited by examiner

Primary Examiner—Joseph Waks
(74) Attorney, Agent, or Firm—Christopher DeVries

(57) ABSTRACT

A power control system for an electric traction motor in a vehicle comprising at least one inverter for providing conditioned electrical power to the electric traction motor, a plurality of power stages for providing DC power to the at least one inverter, each stage including a battery and boost/buck DC—DC converter, the power stages wired in parallel, and where the power stages are controlled to maintain an output voltage to the at least one inverter.

20 Claims, 2 Drawing Sheets

ELECTRICAL MOTOR POWER MANAGEMENT SYSTEM

TECHNICAL FIELD

The present invention relates to a method and apparatus for providing power to an electric motor. More specifically, the present invention relates to a multi-stage power system providing a regulated DC voltage using low voltage batteries that may be conditioned by an inverter to drive an electric traction motor in a vehicle.

BACKGROUND OF THE INVENTION

In today's automotive market, there exist a variety of propulsion or drive technologies used to power vehicles. The technologies include internal combustion engines (ICEs), electric drive systems utilizing batteries and/or fuel cells as an energy source, and hybrid systems utilizing a combination of internal combustion engines and electric drive systems. The propulsion systems each have specific technological, financial, and performance advantages and disadvantages, depending on the state of energy prices, energy infrastructure developments, environmental laws, and government incentives.

The increasing demand to improve fuel economy and reduce emissions in present vehicles has led to the development of advanced hybrid vehicles. Hybrid vehicles are classified as vehicles having at least two separate power sources, typically an internal combustion engine and an electric traction motor. Hybrid vehicles, as compared to conventional vehicles driven by an ICE, offer improved fuel economy and reduced emissions. During varying driving conditions, hybrid vehicles will alternate between separate power sources, depending on the most efficient manner of operation of each power source. For example, a hybrid vehicle equipped with an ICE and an electric motor could shut down the ICE during a stopped or idle condition, allowing the electric motor initially to propel the vehicle and eventually restart the ICE, improving fuel economy and reducing emissions.

Hybrid vehicles are broadly classified into series or parallel drivetrains, depending upon the configuration of the drivetrains. In a series drivetrain utilizing an ICE and an electric traction motor, only the electric motor drives the wheels of a vehicle. The ICE converts a fuel source into mechanical energy, turning a generator which converts the mechanical energy into electrical energy to drive the electric motor. In a parallel hybrid drivetrain system, two power sources such as an ICE and an electric traction motor operate in parallel to propel a vehicle. Generally, a hybrid vehicle having a parallel drivetrain combines the power and range advantages of a conventional ICE with the efficiency and electrical regeneration capability of an electric motor to increase fuel economy and reduce emissions, as compared with a conventional ICE vehicle.

Secondary/rechargeable batteries are an important component of a hybrid vehicle system. Secondary batteries provide for the storage of energy which can be delivered to the wheels of a vehicle on demand. In addition, secondary batteries enable an electric motor/generator (MoGen) to store energy recovered during braking. Accordingly, the batteries provide a means of load balancing, absorbing or delivering the instantaneous difference in energy generated by the ICE with that required by driving conditions.

A battery module may be comprised of several series-connected electrochemical cells. Typical electrochemical cell voltages are in the one to two volt range. Present battery module output voltages are in the 12 to 42 volt range. Conventional vehicle traction systems operate with a DC bus voltage in the high range of substantially 300 to 400 volts. In conventional electric or hybrid vehicle applications, battery modules are stacked in series to provide the desired high DC voltage levels required by the high voltage vehicle traction system. Generally speaking, a high voltage vehicle traction system provides cost, performance and weight advantages, as compared to low voltage traction systems.

Series-connected battery packs complicate a vehicle traction system and affect the reliability of the traction system. The main difficulty with series-connected battery modules is in providing charge balancing to the individual cells comprising the battery modules. Charging and discharging a large number of series-connected cells with a current common to all cells results in poor charge balancing and accelerated aging, caused primarily by operating temperature differences between cells.

SUMMARY OF THE INVENTION

The present invention includes a method and apparatus to utilize a high voltage inverter motor set with low voltage battery modules. The present invention utilizes several power stages to provide a high voltage (substantially 300 to 400 volts) to the vehicle traction system. Each power stage includes a low voltage battery module and a bi-directional boost/buck DC—DC converter. The high voltage sides of the power stages are wired in parallel and connected to at least one voltage inverter and motor set such that the total power load is actively shared by the individual power stages. Each power stage has individual current control, with one overall voltage regulation loop controlling output voltage. The low voltage battery modules may be diode-ored to support miscellaneous low-voltage accessory power loads. In alternate embodiments of the present invention, the battery modules may be replaced with fuel cell power modules.

The present invention, in the preferred embodiment, further includes a vehicle having a parallel hybrid drive system incorporating a hybrid system controller executing the methods of the present invention and an internal combustion engine (ICE), but any vehicle utilizing an electric traction motor or MoGen is considered within the scope of the present invention. The MoGen of the present invention not only provides for propulsion of the vehicle during certain vehicle operating conditions, but also replaces an alternator to charge the battery pack in the vehicle and thus replaces a conventional starter motor to start the ICE. The hybrid system controller of the present invention will utilize the ICE and MoGen to propel or motor the vehicle in a manner that will optimize overall system efficiency, while satisfying required performance constraints.

DESCRIPTION OF THE PREFERRED EMBODIMENT

Figure 1:
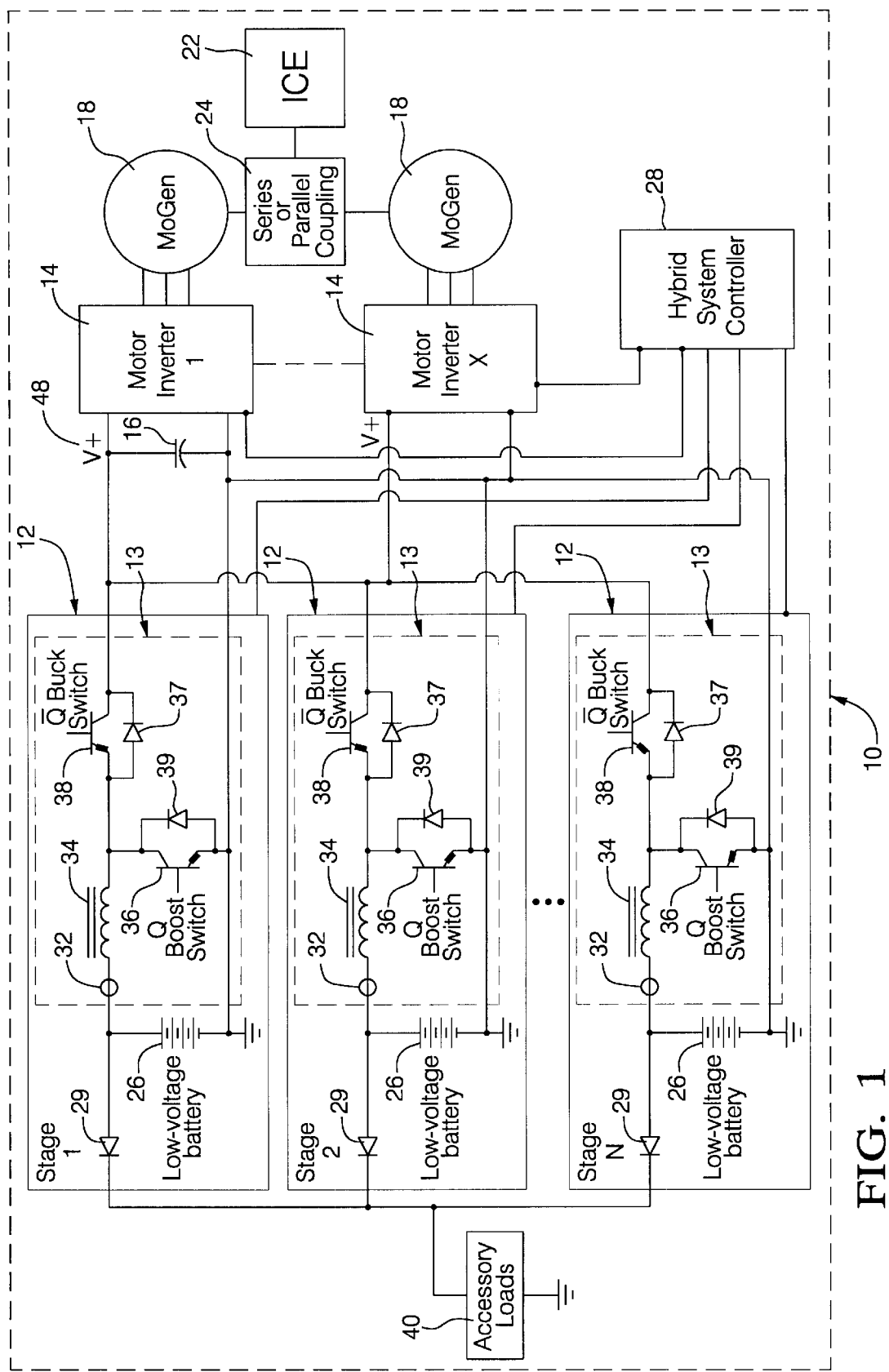
FIG. 1 is a diagrammatic drawing of the power management system of the present invention.

FIG. 1 is a diagrammatic drawing of the power management system of the present invention contained in a hybrid vehicle 10. The hybrid vehicle 10 includes a plurality of power stages 12 wired in parallel to produce a high output voltage V+, substantially in the range of 300 to 400 volts. The voltage V+ is supplied to motor inverters 14 that chop or switch the provided DC voltage V+ to preferably generate three phase power for motor generators (MoGens) 18. The MoGens 18 preferably are AC induction machines, but may comprise any known electrical motor/generator technology, including, but not limited to, DC machines, synchronous machines, and switched reluctance machines. A filter capacitor 16 is provided to stabilize the voltage on the high voltage DC bus.

The MoGens 18 are dynamically coupled to an internal combustion engine (ICE) 22 through a series or parallel coupling 24 and function as either a motor to propel the vehicle 10 or a generator to charge battery modules 26 within the power stages 12, depending on the operating state of the vehicle 10 (i.e., braking, stopped or operating at a constant speed on a highway).

The bi-directional boost/buck converters 13 provide a controllable interface between the low voltage battery modules 26 and a high voltage DC bus 48. Referring to FIG. 1, when the MoGen 18 operates as a motor, power flow is from left to right on FIG. 1, and the bi-directional boost/buck converters 13 are said to be operating in a boost mode. In contrast, when the MoGen 18 operates in generator mode, power flow in FIG. 1 is from right to left, and the bi-directional boost/buck converters 13 are said to be operating in buck mode.

The power stages 12 and motor inverters 14 are controlled by a hybrid system controller 28. In alternate embodiments of the present invention, the controller 28, power stages 12, and motor inverters 14 may be configured as a unitary system. The hybrid system controller 28 may comprise any type of control module or vehicle controller known in the art and is equipped with nonvolatile memory (NVM), random access memory (RAM), discrete and analog input/output (I/O), a central processing unit, communications interfaces for conventional and wireless (Bluetooth®) networking within an automotive communications network, etc. The hybrid system controller 28 may communicate with the power modules 12 and motor inverters 14 using discrete signals, analog signals, or an automotive communications network.

The controller 28 and inverter modules 14 determine the direction of power or current flow for the MoGens 18, according to the vehicle 10 operating state. As discussed previously, the boost/buck DC—DC converters 13 within the power stages 12 act to regulate the high voltage DC bus 48 to a voltage V+ via pulse-width modulation. In a regeneration state (such as during braking) or charging condition, power flows from the MoGens 18, via the inverter modules 14, to charge the batteries 26 in the power stages 12. In a state where the MoGens 18 are needed to provide propulsion, power flows from the power stages 12 through the inverter modules 14, to the MoGens 18.

The power stages 12 each include a first output diode 29, the batteries 26, a current sensing element 32, an inductor 34, a boost switch 36, and a buck switch 38. The output diodes 29 are coupled to the batteries 26 to provide power to accessory loads 40 in the vehicle 10. The inductor 34 is used to provide boost or buck energy storage and smooth the ripple current flowing into and out of the batteries 26. The current sensing element 32 provides current measurements to the controller 28.

The batteries 26 used in the present invention are preferably low voltage batteries having a voltage in substantially the range of 12 volts to 42 volts. In the preferred embodiment, the batteries are comprised of NiMH batteries. In alternate embodiments of the present invention, the batteries 26 may comprise any known battery technology, including, but not limited to, lead acid and lithium polymer.

The boost switch 36 and buck switch 38 depicted in FIG. 1 are generic NPN transistors, but may be implemented using any known electrical switching device including, but not limited to, power MOSFETs, IBGTs, or bipolar transistors. A boost diode 37 may comprise the integral body diode of buck switch 38, when MOSFET devices are used to implement buck switch 38. Similarly, a buck diode 39 may comprise the integral body diode of boost switch 36, when MOSFET devices are used to implement boost switch 36.

Figure 2:
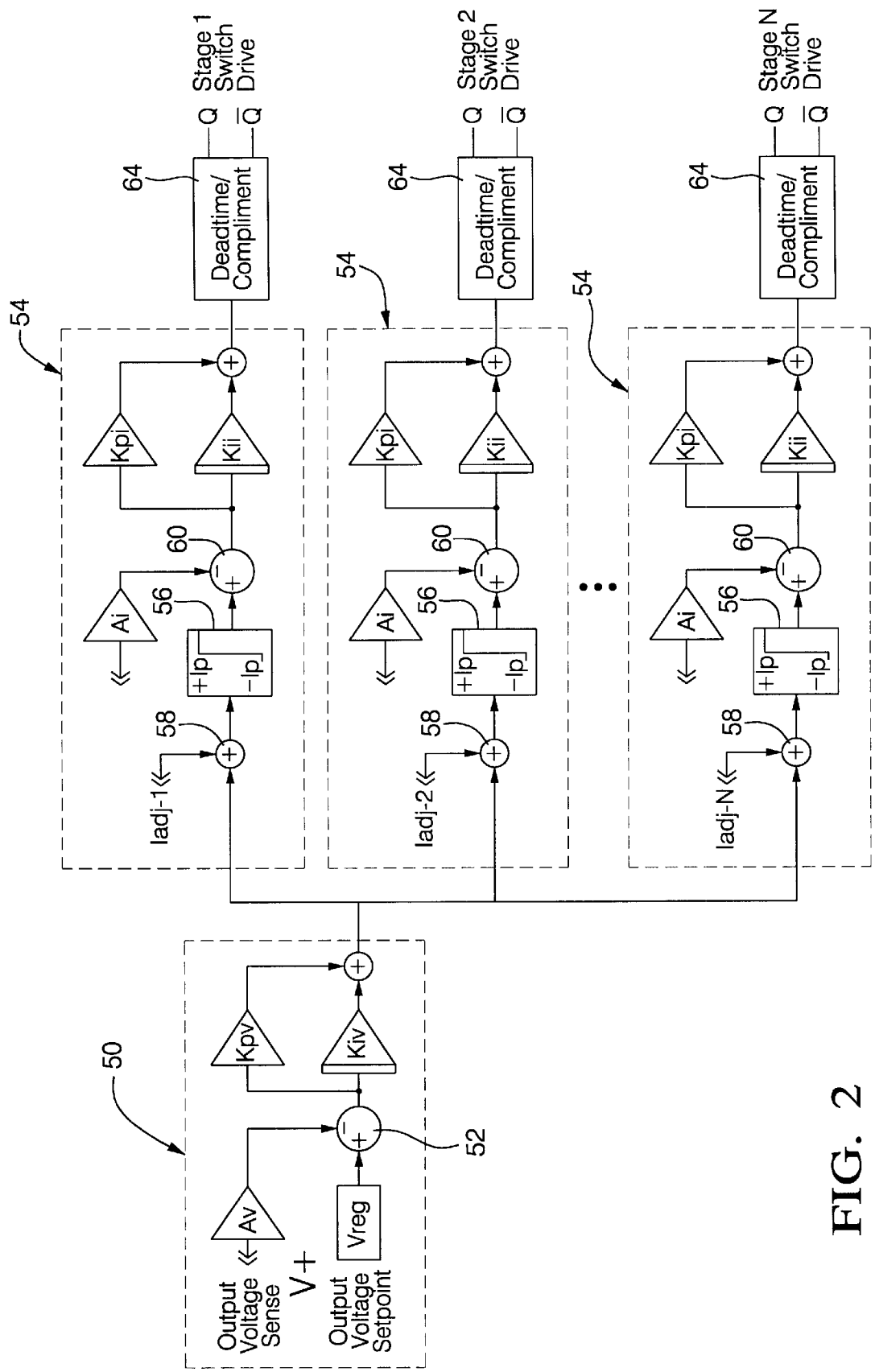
FIG. 2 is a process control diagram for the power management system of the present invention.

A block diagram of the control system of the present invention implemented in controller 48 is shown in FIG. 2. The control system consists of a single voltage controller 50 and a plurality of current controllers 54. The voltage controller 50 regulates the high voltage DC bus voltage to a desired setpoint value, as required by the motor inverters 14. The current controllers 54 regulate current flowing into or out of the individual batteries 26, and one current controller 54 is used to control each power stage 12 in the system.

In the preferred power management method of the present invention, current will be actively steered between the power stages 12 to provide improved aging characteristics of the batteries 26 by balancing charge and thermal operation. In a motoring or traction mode for the vehicle 10 and the MoGens 18, current from each battery 26 is controlled to obtain a balanced discharge. Since the power stages 12 are wired in parallel, the total load power is actively shared. In a regeneration mode, current is controlled into each energy storage block to obtain a balanced charge for the batteries 26. The regenerative current is divided between the stages 12 to charge the batteries 26. Energy transfer between the batteries 26 in the power stages may also be used to balance the batteries 26. A battery management control algorithm in the hybrid system controller 28 will select what proportion of total load or regeneration current passes through each battery 26 such that the battery is actively maintained at the same average state of charge (SOC) as the other batteries 26 in the system. SOC is defined as the percentage of full capacity of a battery that is still available for further discharge. Accessory loads 40 are tapped via the diodes 29 to the batteries 26.

The basic control loop of the present invention in FIG. 2 is shown as a current-mode boost/buck control system. The voltage controller 50 includes a sensed and amplified voltage provided by a voltage sensor 48 (seen in FIG. 1), a voltage setpoint Vreg, a summing junction 52 to generate a voltage error, and a proportional plus integral controller having proportional gain Kpv and integral gain Kiv acting on the error and generating an output at summing junction 53. Each current controller 54 regulates sensed current by current sensors 30 to a value demanded by the voltage loop 50.

Nominally, the current flowing in each power stage is 1/N of the total current into or out of the motor inverters 14, where N is the number of parallel connected power stages 12. Each current controller 54 can clamp the maximum positive or negative current through its corresponding power stage 12 at blocks 56 to within the range of the Ip variables, between Ip+ and Ip−, providing independent current limit control for each power stage 12. This independent current limiting allows dynamic safe operating limits and may also be controlled to prevent excess current flow in the event of a shorted battery 26 or other fault in any of the power stages 12.

To this control method are added the summed variables Iadj(n) at summing junctions 58. The Iadj(n) values are derived by an overall battery SOC management algorithm in the hybrid controller 28. Since the Iadj(n) are continuously adjustable in all modes (traction, regenerative braking and at idle standstill), the balance of current flow between the power stages 12 is actively controlled to maintain the desired SOC in each battery. Any remaining battery SOC balancing required at the beginning or end of a drive cycle can be obtained by setting the Iadj(n) values to redistribute battery charge between the batteries 26 for equalization.

In the operation of the current control loops 54, sensed current with a gain of Ai and the limited current setpoint [Iadj(n) within the current limits] are added at summing junctions 60 to generate an error. Proportional gain Kpi and integral gain Kpi act on the error to generate an output at deadtime blocks 64 to switch the discrete outputs Q and Q'. Q is the input to the boost switch 36 and Q' is the input to the buck switch 38. Accordingly, the boost switch and buck switches 36 and 38 will be pulse-width modulated in response to the voltage loop 50 and current loops 54 to maintain the output voltage V+ and balance the charge on the batteries 26.

While this invention has been described in terms of some specific embodiments, it will be appreciated that other forms can readily be adapted by one skilled in the art. Accordingly, the scope of this invention is to be considered limited only by the following claims.

We claim:

1. A power control system for an electric traction motor in a vehicle comprising:
    at least one inverter for providing conditioned electrical power to the electric traction motor;
    a plurality of power stages for providing DC power to said at least one inverter, each stage including a battery and boost/buck DC—DC converter, said power stages wired in parallel; and
    wherein the power stages are controlled to maintain an output voltage to said at least one inverter.

2. The power control system of claim 1 wherein each stage is individually current controlled to balance the state of charge of each said battery.

3. The power control system of claim 1 wherein said inverter provides switched three phase power to said electric motor.

4. The power control system of claim 1 wherein said battery comprises a low voltage battery.

5. The power control system of claim 4 wherein said battery comprises a battery having a voltage of substantially 12 volts.

6. The power control system of claim 4 wherein said battery comprises a battery having a voltage of substantially 42 volts.

7. The power control system of claim 1 further including a current sensor for each power stage to detect the current in the power stage.

8. The power control system of claim 1 wherein each said power stage includes a boost switch.

9. The power control system of claim 1 wherein each said power stage includes a buck switch.

10. A vehicle drive system:
    a plurality of power stages, each said power stage including a battery, and a boost/buck DC—DC converter;
    at least one motor inverter electrically coupled to said plurality of power stages for providing conditioned electrical power;
    at least one electrical motor electrically coupled to said at least one motor inverter; and
    wherein said plurality of power stages are individually current controlled and wherein said plurality of power stages are jointly controlled to regulate an output voltage.

11. The vehicle drive system of claim 10 further comprising an internal combustion engine coupled in a parallel hybrid configuration with said electric motor.

12. The vehicle drive system of claim 10 further comprising an internal combustion engine coupled in a series hybrid configuration with said electric motor.

13. The vehicle drive system of claim 10 wherein said battery comprises a battery having an operating voltage of substantially 12 volts.

14. The vehicle drive system of claim 10 wherein said motor is an induction motor.

15. The vehicle drive system of claim 10 wherein said battery operates at a voltage of substantially 42 volts.

16. The vehicle drive system of claim 10 wherein said motor inverter provides three phase electrical power to said electric motor.

17. The vehicle drive system of claim 10 further including a current sensor for each said DC—DC converter.

18. A method of generating voltage for the operation of an electric motor in a vehicle comprising:
    providing a plurality of power stages connected in parallel, each power stage including a boost/buck DC—DC converter and low voltage battery;
    providing at least one motor inverter for generating conditioned electric power to the electric motor to actuate the electric motor;
    sensing the current provided by each power stage;
    controlling the current individually in each power stage; and
    controlling the overall output voltage of the plurality of power stages wired in parallel.

19. The method of claim 18 further comprising the step of controlling regeneration current into each power stage to obtain a balanced charge in each low voltage battery.

20. The method of claim 18 further comprising the step of controlling the current from each power stage to obtain a balanced discharge in each low voltage battery.

* * * * *